United States Patent [19]

Tsukagoshi et al.

[11] 4,261,580
[45] Apr. 14, 1981

[54] ARM PIPE FOR RECORD PLAYER TONEARMS

[75] Inventors: Tsunehiro Tsukagoshi; Shinichi Yokozeki; Toshikazu Yoshino; Yasuyuki Arai, all of Ohmori-nishi, Japan

[73] Assignee: Pioneer Electronic Corporation, Tokyo, Japan

[21] Appl. No.: 63,531

[22] Filed: Aug. 3, 1979

[30] Foreign Application Priority Data

Aug. 4, 1978 [JP] Japan .................................. 53-94652
Aug. 18, 1978 [JP] Japan .................................. 53-99953
Dec. 28, 1978 [JP] Japan .................................. 53-161225

[51] Int. Cl.³ .......................... G11B 3/10; B29D 3/02; D03D 43/00
[52] U.S. Cl. .................................... 369/158; 138/174; 264/29.1; 264/108; 428/36
[58] Field of Search ............ 274/23 R, 1 R; 138/172, 138/174, 177; 428/36, 542; 264/108, 29.1

[56] References Cited

U.S. PATENT DOCUMENTS

| 3,918,722 | 11/1975 | Nakajima et al. | 274/23 R |
| 3,923,309 | 12/1975 | Nakajima et al. | 274/23 R |
| 3,957,272 | 5/1976 | Yasuda | 274/23 R |
| 3,980,105 | 9/1976 | Myskowski | 428/36 |
| 4,086,378 | 4/1978 | Kam et al. | 428/36 |
| 4,147,364 | 4/1979 | Nakatsuka | 274/1 R |

Primary Examiner—William R. Dixon, Jr.
Attorney, Agent, or Firm—Lackenbach, Lilling & Siegel

[57] ABSTRACT

An arm pipe for a record player tonearm comprises a composite material essentially consisting of a thermoplastic resin and graphite powder. The composite material is prepared by kneading the components, rolled to impart a degree of orientation to the graphite powder particles, which are in the form of flaky graphite and then molded into a pipe, along the surface of which the graphite particles are oriented. Arm pipes wherein the composite material is oxidized at the surface of the pipe and arm pipes wherein the composite material is carbonized or graphitized are also included. A light weight, rigid arm pipe having a high specific modulus of elasticity is obtained through a simple procedure at low cost.

8 Claims, 5 Drawing Figures

ARM PIPE FOR RECORD PLAYER TONEARMS

BACKGROUND OF THE INVENTION

This invention relates to arm pipes for record player tonearms.

The recent trend of tonearms for record players is directed toward a reduction of the mass and an increase of the compliance of a vibration system in order to enhance the trackability of a cartridge.

With the compliance of a cartridge increased, the low range resonance frequency attributable to the cartridge compliance and the equivalent mass of a tone arm (including the cartridge) at the stylus tip is reduced such that noise signals due to warpage and eccentricity of a record may be often picked up. That is, the increased compliance results in a reduced signal-to-noise ratio. It is therefore necessary to adjust low range resonance to an inoffensive level, generally to a range of 10 to 15 hertz while the stylus equivalent mass is kept low.

To reduce the equivalent mass at the stylus tip, in usual practice, tonearm component parts such as arm pipe and head shell may be reduced in weight. Parts having a wall thickness reduced for light weight exhibit a low rigidity which in turn, allows undesirable phenomena such as partial vibration to occur, resulting in deteriorated sound quality. To obtain light weight arm pipes and head shells having a high rigidity, materials are required having a high specific modulus of elasticity.

In prior art arm pipe and head shell manufacture, aluminum and titanium are used because they have a relatively high specific modulus. However, the use of a cartridge with an increased compliance requires the arm pipes and head shells to be made of material having a higher specific modulus than aluminum and titanium.

Arm pipes and head shells made of fibrous carbon are known. Fibrous carbon itself has a sufficiently high specific modulus while it cannot be formed into a part without a binder. Usually, resin is used to bind fibrous carbon. However, the addition of a resin binder to fibrous carbon causes the specific modulus of elasticity to reduce to a level equal to or less than those of aluminum and titanium. Therefore, the fibrous carbon composite material is not satisfactory as the material for arm pipes and head shells.

SUMMARY OF THE INVENTION

Accordingly, it is an object of the present invention to provide a high performance arm pipe made of a light weight, rigid composite material having a high specific modulus of elasticity.

According to one aspect of this invention, there is provided an arm pipe for a tonearm of a record player which comprises a composite material of a thermoplastic resin and graphite powder. The material is obtained simply by kneading the components and the graphite powder particles are oriented substantially in parallel with the surface of the pipe.

According to another aspect of this invention, the material in the form of a pipe is oxidized at least at the surface of the pipe. The material may also be carbonized.

To provide the graphite powder particles with a substantial degree of orientation, the kneaded mixture may preferably be rolled into a sheet and the sheet is then formed into a pipe.

BRIEF DESCRIPTION OF THE DRAWING

The invention will now be described in further detail by referring to the accompanying drawings wherein.

DESCRIPTION OF THE PREFERRED EMBODIMENTS

Figure 1:
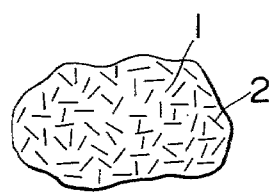
FIG. 1 is a partial cross-sectional view of a mixture of graphite particles and a resin matrix.

The thermoplastic resins used herein include polyvinyl chloride, polyvinylidene chloride, vinyl chloride-acrylonitrile copolymers, vinylidene chloride-acrylonitrile copolymers, vinyl chloride-vinyl acetate copolymers, etc., and mixtures thereof. The resins may be changed into a pitch-like state by dry distillation before it is kneaded with graphite powder according to this invention.

The graphite powder is available from many manufacturers. Flaky graphite powder is most preferable. The graphite powder may preferably have an average particle size of less than 20 microns (inclusive), particularly 0.1 to 5 microns.

The weight ratio of resin to graphite varies from 1:9 to 9:1, preferably 3:7 to 7:3.

An example of this invention is shown below. Polyvinyl chloride (to be abbreviated as "PVC" hereinafter) is used as a typical thermoplastic resin. In a kneader, 30 parts by weight of PVC is blended and kneaded with 70 parts by weight of graphite powder at a temperature of 130°–200° C. The green intimate mixture is further mixed and rolled into a sheet at a similar temperature. This sheet exhibits a Young's modulus E of 6,000 kg/mm$^2$ (5.9×10$^{10}$ N/m$^2$) and a density of $\rho$ of 1.8 g/cm$^3$. The specific modulus of elasticity calculated in terms of $\sqrt{E/\rho}$ is 5.7×10$^3$ m/sec, which value is higher than the specific modulus of titanium of 5.2×10$^3$ m/sec. The green, but oriented sheet is formed into a pipe though the following description omits this process for the purpose of illustrating measured values.

The rolled sheet is then subjected to presintering or oxidation by gradually heating it in an oxidizing atmosphere to a temperature of 100°–500° C., preferably 250°–300° C. at a rate of 1°–10° C./hour. The oxidized product has a Young's modulus E of 9,000 kg/mm$^2$, a density $\rho$ of 1.8 g/cm$^3$ and a specific modulus $\sqrt{E/\rho}$ of 7.0×10$^3$ m/sec.

The oxidized sheet is further subjected to carbonization or graphitization by heating it in a non-oxidizing atmosphere or in vacuum to a temperature of about 1200° C. or higher at a rate of 10°–20° C./hour. The carbonized sheet exhibits a Young's modulus E of 16,000 kg/mm$^2$ and a density $\rho$ of 1.8 g/cm$^3$. The specific modulus of elasticity of 9.33×10$^3$ m/sec is about 2 times higher than those of aluminum and titanium. Graphitization of the sheet at about 2500° C. increases the Young's modulus 1.5 times to 24,000 kg/mm$^2$.

Orientation of graphite powder particles is essential to achieve the above-illustrated desired values. When PVC is kneaded with graphite powder and the resulting green mixture is formed into a desired shape by extrusion, for example, without an orientation procedure, the resulting product shows a poor Young's modulus. By way of example, when 30 parts of PVC was kneaded with 70 parts of graphite powder and the mixture was then extrusion molded by means of an extruder into a plate, the plate showed a Young's modulus of about 1,300 kg/mm$^2$. This value is less than a quarter of that of the graphite-oriented sheet described above. Further carbonization of this non-oriented plate resulted in a Young's modulus of about 4,000 kg/mm$^2$, which value is about 1/6 of that of the graphite-oriented one after carbonization.

Further, it has been found that the internal loss (tan $\delta$) of the composite material according to this invention is higher than those of aluminum and titanium. The higher the internal loss, the less undesirable resonance is liable to occur.

The measurements of various properties show that the composite material of this invention has a relatively light weight, a high rigidity, a high specific modulus of elasticity, and a good internal loss.

As described above, to fabricate an arm pipe without impairing the characteristics of the composite material according to this invention, graphite powder particles must be oriented in the resulting arm pipe. In this respect, extrusion molding which is generally used in prior art arm pipe manufacture is not applicable because graphite particles are not substantially oriented so that molded products are less rigid.

Referring to FIG. 1, a fragmental portion of a kneaded or intimate mixture is shown wherein a resin matrix 1 contains graphite flakes 2 at random. The graphite particles in the form of a flake may be considered as a disc having a high ratio of diameter to thickness. The intimate mixture shows a random distribution of graphite flakes 2 in the resin matrix 1.

Figure 2:
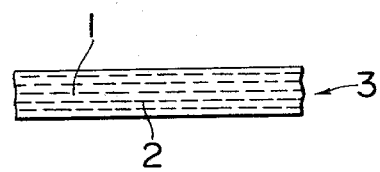
FIG. 2 is a partial cross-sectional view of a sheet of a composite material wherein graphite particles are oriented in a resin matrix.

The intimate mixture is then rolled into a sheet at elevated temperatures by means of rollers, presses or the like. FIG. 2 shows a rolled sheet 3 wherein graphite flakes 2 are oriented in parallel with the surface of the sheet 3. Rolling is a typical, but non-limiting treatment for imparting a substantial degree of orientation to graphite particles. The thickness of the sheet 3 may suitably be selected in accordance with a desired wall thickness of an arm pipe.

Figure 3:
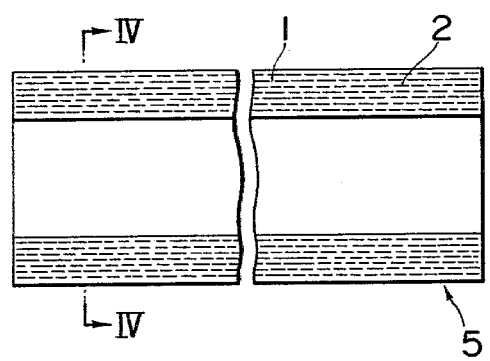
FIG. 3 is an axial cross-sectional view of the arm pipe of the invention.
Figure 4:
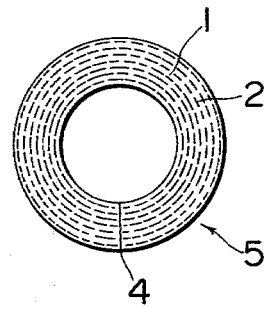
FIG. 4 is a cross-sectional view of the arm pipe taken along the line IV—IV in FIG. 3.

Thereafter, the sheet 3 is rounded into a pipe of a desired diameter under high temperature and pressure conditions as shown in FIGS. 3 and 4. The opposite ends of the sheet may be joined at an interface 4 in any suitable manner as by thermal pressure bonding or by applying an adhesive. A pipe may also be fabricated by wrapping the sheet in the form of an elongated narrow tape around a core in a spiral manner. Alternatively, two sheets may be placed at the opposite sides of a cylindrical core and then press or compression molded at elevated temperatures. The pipe may be fabricated to a given length of arm pipe or a long cylindrical product may be cut to a given length. In either case, graphite particles are oriented in parallel with the surface of the arm pipe as shown in FIGS. 3 and 4. There is obtained a rigid arm pipe.

After the arm pipe 5 shown in FIGS. 3 and 4 is formed, it is subjected to pre-sintering or oxidation by heating it in an oxidizing atmosphere to a temperature of about 250° C. at a rate of 1°–10° C./hour. Further, the arm pipe is subjected to carbonization or graphitization by heating it in a non-oxidizing atmosphere to a temperature of 1200° C. at a rate of 10°–20° C./hour. The rigidity of the arm pipe is increased by carbonization while the internal loss is reduced in proportion.

The arm pipe 5 is susceptible to deformation during the pre-sintering or oxidation step. Therefore, the arm pipe should be supported in a suitable manner, for instance, by inserting a core (made of material not deformable at a temperature above 250° C.) into the bore of the pipe, or by enclosing the pipe within a support sheath. Since the pipe becomes self-supporting after the oxidation, no support is required during carbonization.

The carbonization temperature may be higher than 1200° C. The arm pipe graphitized at a temperature of 2,500° C. is 1.5 times higher in rigidity than that carbonized at a temperature of 1,200° C.

Figure 5:
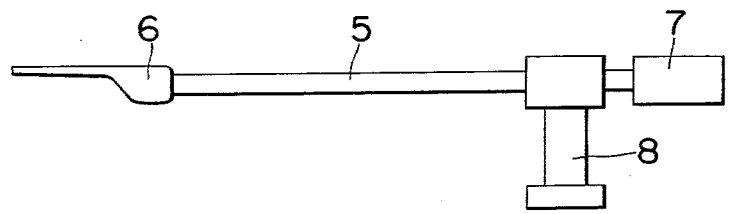
FIG. 5 is a schematic view of a tonearm system.

FIG. 5 shows an entire tonearm system. The arm pipe 5 of this invention has a head shell 6, which may be fabricated of the same material as the arm pipe, and a counter weight 7 mounted at opposite ends, and is supported by an arm support 8.

A sample was prepared by blending and kneading a polyvinyl chloride-polyvinyl acetate copolymer and graphite powder at a weight ratio of 1:2. The resulting intimate mixture was rolled to achieve a substantial degree of orientation of graphite. Measurement was made after rolling, oxidation, and carbonization. The results are tabulated below.

TABLE

|  | Density $\rho$(g/cm$^3$) | Young's modulus E (kg/mm$^2$) | Specific modulus $\sqrt{E/\rho}$ (m/sec) | loss tan $\delta$ |
| --- | --- | --- | --- | --- |
| Rolled | 1.8 | 6,000 | 5.7 × 10$^3$ | 0.05 |
| Oxidized | 1.8 | 9,000 | 7 × 10$^3$ | 0.02 |
| Carbonized | 1.8 | 16,000 | 9.33 × 10$^3$ | 0.015 |
| Aluminum | 2.7 | 7,400 | 5.18 × 10$^3$ | 0.003 |
| Titanium | 4.4 | 12,000 | 5.22 × 10$^3$ | 0.003 |

As understood from the foregoing, the orientation of graphite powder particles in the resinous matrix in a direction substantially parallel with the surface provides a light weight arm pipe having a high rigidity, that is, an arm pipe having a low equivalent mass at the stylus tip. Such an arm pipe tends to pick up few noise signals due to warpage and eccentricity of a record and ensures reproduction at an improved S/N ratio when used in combination with a high compliance cartridge. The arm pipe of the invention has an internal loss such that undesirable resonance or partial vibration may not occur. Further, the composite material is readily prepared by kneading relatively inexpensive starting components, orientation is imparted by rolling or other suitable treatments, and the material is formed by a conventional method. These factors contribute to a reduction of cost.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. An arm pipe for a record player tonearm comprising a composite material essentially consisting of 10–90 parts by weight of a thermoplastic resin and 90–10 parts by weight of flaky graphite wherein the composite material is prepared by kneading the components and the graphite flakes are oriented substantially in parallel with the surface of the shell.

2. An arm pipe according to claim 1, wherein said composite material is oxidized at least at the surface of the pipe.

3. An arm pipe according to claim 1, wherein said composite material is carbonized.

4. An arm pipe according to claim 1, wherein said pipe is fabricated by kneading the components, rolling the kneaded mixture into a sheet to achieve a substantial degree of orientation of the graphite flakes, and then forming the sheet into a hollow cylinder.

5. An arm pipe according to any one of claims 1 to 3, wherein said thermoplastic resin is selected from the group consisting of polyvinyl chloride, polyvinylidene chloride, vinyl chloride-acrylonitrile copolymers, vinylidene chloride-acrylonitrile copolymers, vinyl chloride-vinyl acetate copolymers, and mixtures thereof.

6. An arm pipe according to any one of claims 1 to 3, wherein said graphite flakes have a particle size of 0.1 to 20 microns.

7. An arm pipe according to claim 6, wherein said graphite flakes have a particle size of 0.1 to 5 microns.

8. An arm pipe according to claim 1, wherein said composite material includes 30 to 70 parts by weight of said thermoplastic resin and 70 to 30 parts by weight of said flaky graphite.

* * * * *